(12) United States Patent
Turner et al.

(10) Patent No.: US 6,665,912 B2
(45) Date of Patent: Dec. 23, 2003

(54) WEB ADJUSTER

(75) Inventors: Dennis M. Turner, Mooresville, IN (US); Michael C. Dorsey, Brownsburg, IN (US); Andrew B. Mendenhall, Indianapolis, IN (US); Richad Glover, Greenwood, IN (US)

(73) Assignee: Cosco Management, Inc., Wilmington, DE (US)

( * ) Notice: Subject to any disclaimer, the term of this patent is extended or adjusted under 35 U.S.C. 154(b) by 0 days.

(21) Appl. No.: 10/115,797

(22) Filed: Apr. 3, 2002

(65) Prior Publication Data

US 2003/0188400 A1 Oct. 9, 2003

(51) Int. Cl.[7] ................................................ A44B 11/06
(52) U.S. Cl. ........................ 24/171; 24/194; 297/250.1
(58) Field of Search .............................. 297/250.1, 253; 24/685 B, 171, 194, 196, 197, 190, 181

(56) References Cited

U.S. PATENT DOCUMENTS

| | | | | |
|---|---|---|---|---|
| 4,035,877 A | * | 7/1977 | Brownson et al. | ............ 24/323 |
| 4,167,054 A | * | 9/1979 | Yamada et al. | ................ 24/171 |
| 4,184,234 A | | 1/1980 | Anthony et al. | |
| 4,685,741 A | | 8/1987 | Tsuge et al. | |
| 5,039,169 A | | 8/1991 | Bougher et al. | |
| 5,380,066 A | | 1/1995 | Wiseman et al. | |
| 5,471,714 A | * | 12/1995 | Olson | ........................... 24/171 |
| 5,580,126 A | | 12/1996 | Sedlack | |
| 6,273,505 B1 | | 8/2001 | Carnahan | |
| 6,425,632 B1 | * | 7/2002 | Anthony et al. | ......... 297/250.1 |

FOREIGN PATENT DOCUMENTS

FR 2548983 A * 1/1985 ............ A47D/1/10

* cited by examiner

Primary Examiner—James R. Brittain
(74) Attorney, Agent, or Firm—Burns, Doane, Swecker & Mathis, L.L.P.

(57) ABSTRACT

A web adjuster is provided including a housing, an actuator movably coupled to the housing, and a pincher that releasably retains a web threaded through the housing. The actuator moves the pincher between a first position inhibiting movement of the web relative to the housing and a second position permitting movement of the web relative to the housing.

21 Claims, 11 Drawing Sheets

WEB ADJUSTER

FIELD OF THE INVENTION

The present disclosure relates to an apparatus for adjusting the length of a belt or similar article. Specifically, this disclosure relates to an adjuster that locks to maintain the length of a web to secure a juvenile seat in place upon a vehicle seat and that unlocks to permit adjustments in the length of the web.

BACKGROUND AND SUMMARY

Web adjusters are commonly used to lock and maintain the length of a strap, tether, belt, or similar article. Such adjusters often require actuation of the adjuster or manipulation of the web to move the web in a direction lengthening the web or shortening the web. Such adjusters have been used to secure children in juvenile seats in a vehicle.

Juvenile seats are frequently anchored to a vehicle seat using the vehicle's occupant restraint systems. Some vehicles are now being equipped with juvenile seat anchoring systems that supplement or replace the standard occupant restraint systems to restrain juvenile seats. In such anchoring systems, a tether extends between the juvenile seat and a permanent anchor such as a ring, bar, bracket or other device on the vehicle. The tether is coupled at one location to the juvenile seat and at another location to the anchor. The tether can be coupled to the juvenile seat using a variety of methods, including those disclosed in U.S. patent application Ser. No. 10/074,637 now U.S. Pat. No. 6,592,183 entitled "Vehicle Anchor System for Juvenile Vehicle Seat," filed Feb. 13, 2002, by James M. Kain, and U.S. patent application Ser. No. 10/074,798 entitled "Vehicle Anchor System for Juvenile-Seat Base," filed Feb. 13, 2002, by James M. Kain, the disclosures of which are hereby incorporated herein by reference. To properly secure the juvenile seat to the anchor, the length of the tether is adjusted to remove slack in the tether.

The number and locations of anchors vary depending on whether the upper or lower portion of the juvenile seat is to be coupled to the anchor. Anchors for upper tether systems can be located, for example, in the rear shelf area behind the rear seats of a passenger car or on the floor behind a rear seat of a van or sport utility vehicle. In these systems, the tether extends from the top of the juvenile seat back, over the vehicle seat back, and couples to the upper tether anchor. Anchors for lower tether systems are positioned between the vehicle seat back and seat bottom. In these systems, the tether extends between the lower portion of the juvenile seat and the anchor. If a vehicle is not equipped with such anchors, after-market anchor kits are available for purchase and installation.

According to the present disclosure, a tether length adjuster for use with an adjustable tether system having an adjustable web for securing a juvenile seat to a vehicle seat is provided. The adjuster comprises a housing adapted to receive the adjustable web, an actuator coupled to the housing, and a pincher having a pinching edge. The actuator includes an actuation button spaced apart from the pincher. The pincher is normally biased in a first direction so that the pinching edge engages the adjustable web to prevent the adjustable web from moving in a tether-lengthening direction relative to the housing. The pincher moves in a second direction opposite the first direction in response to a pressing force applied to the button. Movement of the pincher in the second direction permits the adjustable web to be moved in the tether-lengthening direction.

In illustrative embodiments, the actuator includes a pair of buttons each pivotably coupled to the housing and to a flexible arm. Each arm is coupled to a carrier portion of the actuator that moves the pincher when a force is applied to the buttons of the actuator. Also in illustrative embodiments, the actuator is formed as a single, monolithic piece. The illustrative web adjusters comprise a plate coupled to the housing, and part of the actuator is sandwiched between the plate and the housing. The plate includes an engagement edge, and the actuator includes a biasing member to bias the pinching edge toward the engagement edge.

In operation, a tether is inserted through a slot in the housing, around the pincher, and back through the slot in the housing. The tether is normally pinched between the pinching edge of the pincher and the engagement edge of the plate to prevent lengthening of the tether. Squeezing the pair of buttons flexes the arms and moves the carrier portion, which, in turn, moves the pinching edge of the pincher away from the engagement edge to permit lengthening of the tether. The tether length may be shortened without actuation of the actuator by pulling on a free end of the tether, but the tether may be lengthened only after actuation of the actuator. Additional features will become apparent to those skilled in the art upon consideration of the following detailed description exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DRAWINGS

Figure 1:
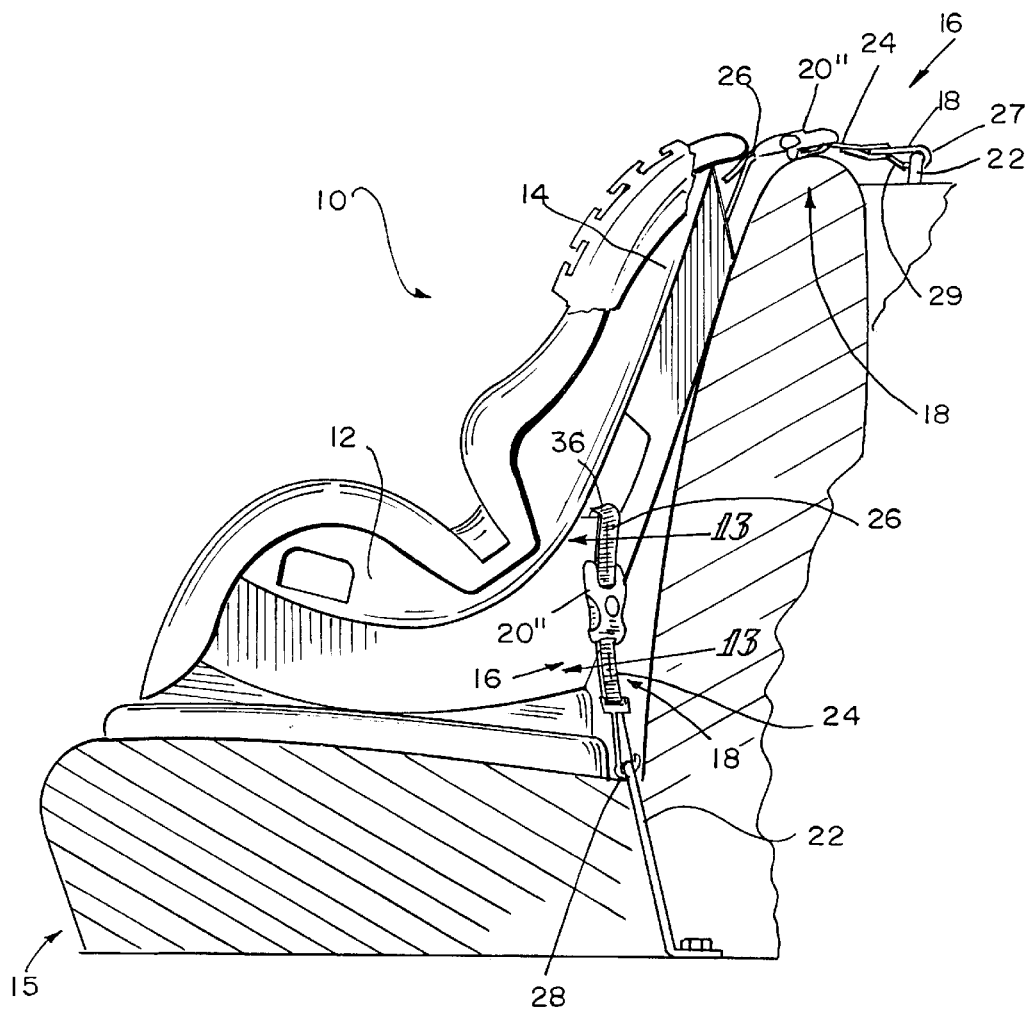
FIG. 1 illustrates a fragmentary side elevational view of a juvenile seat secured on a vehicle seat (shown in section) by a tethering system having a tether, an anchor, and one embodiment of an adjuster according to an embodiment of the present invention.
Figure 2:
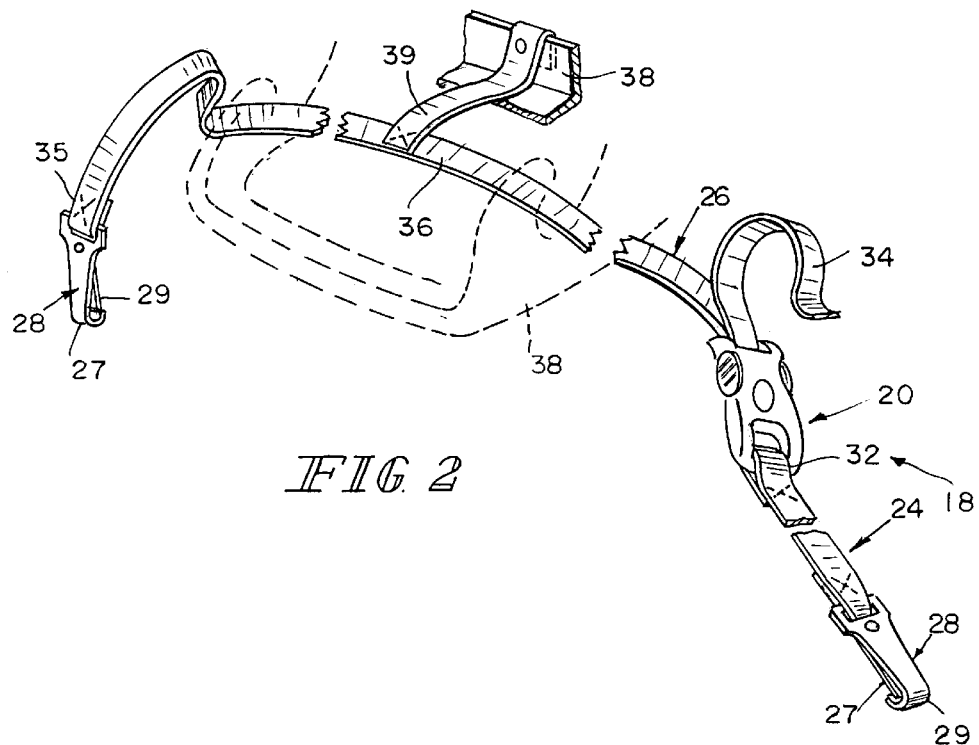
FIG. 2 illustrates a fragmentary perspective view of another embodiment of a tether and adjuster showing the tether draped across a portion of a juvenile seat base (in phantom), a retention strap coupled to another portion of the base (in solid lines) and the tether, and a retainer for coupling the tether to two anchors (not shown)

As illustrated in FIG. 1, a juvenile seat 10 includes a seat bottom 12 and a seat back 14 coupled to and extending upwardly from seat bottom 12. Juvenile seat 10 is adapted to rest on a vehicle seat 15 as illustrated in FIG. 1, or a base 38 as illustrated in FIG. 2. Tethering system 16 secures the juvenile seat 10 on the vehicle seat by coupling directly to the juvenile seat 10 or to another component to which the juvenile seat is then coupled, such as base 38.

Figure 6:
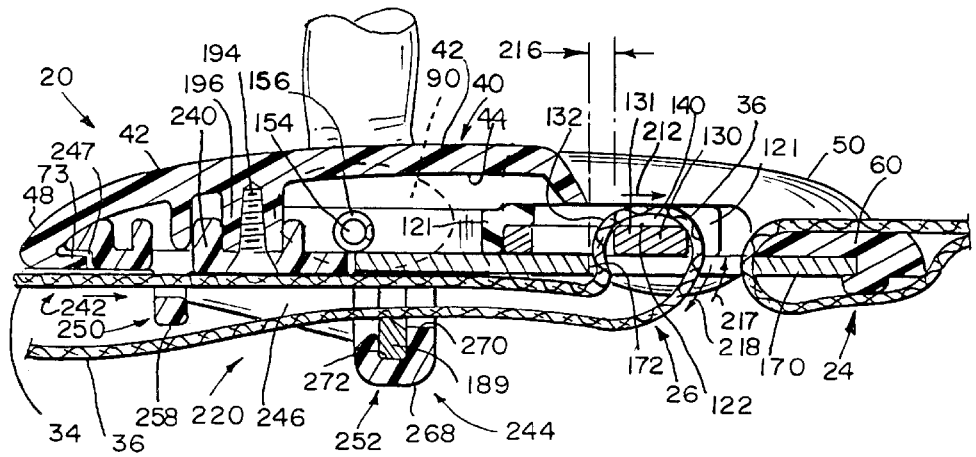
FIG. 6 illustrates an inverted sectional view taken generally along section line 6—6 of FIG. 2 showing the actuator and pincher moved to the web adjusting position by a user squeezing two buttons together to release the pincher, an adjustable web looped around the pincher, and a fixed web coupled to the adjuster.
Figure 7:
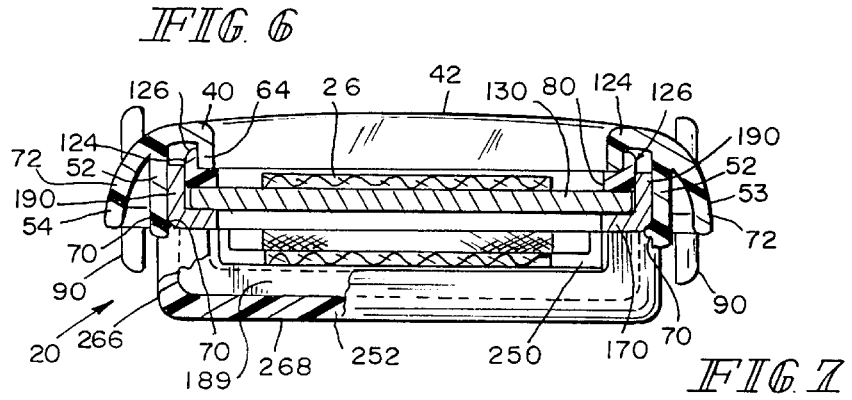
FIG. 7 illustrates a sectional view similar to FIG. 6 showing the actuator and pincher in the web retaining position pinching the adjustable web between a pinching edge of the pincher and an engagement edge of the adjuster.
Figure 8:
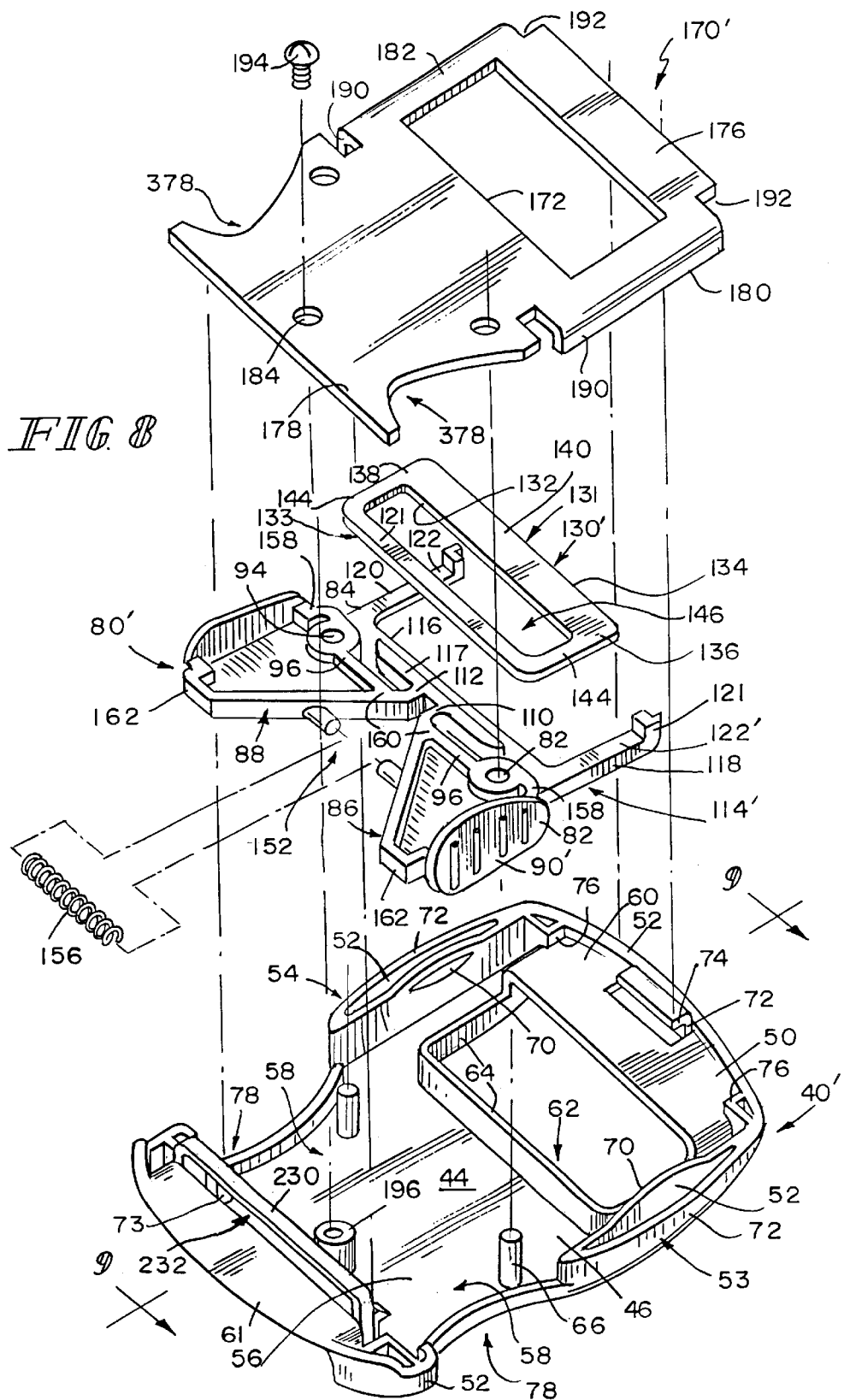
FIG. 8 illustrates an exploded perspective view of a second embodiment of the adjuster showing a plate at the top of the page separated from an adjuster housing at the bottom of the page to expose an actuator and a pincher situated between the plate and the housing.
Figure 9:
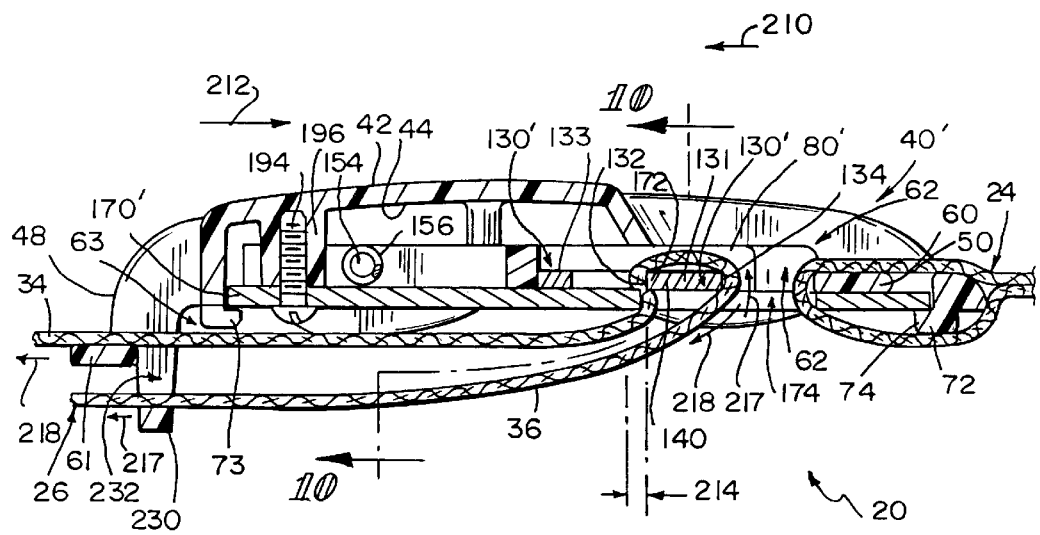
FIG. 9 illustrates a sectional view of the second embodiment, taken generally along section lines 9—9 of FIG. 8, showing the actuator and pincher in the web retaining position pinching the adjustable web between a pinching edge of the pincher and an engagement edge of the adjuster.
Figure 10:
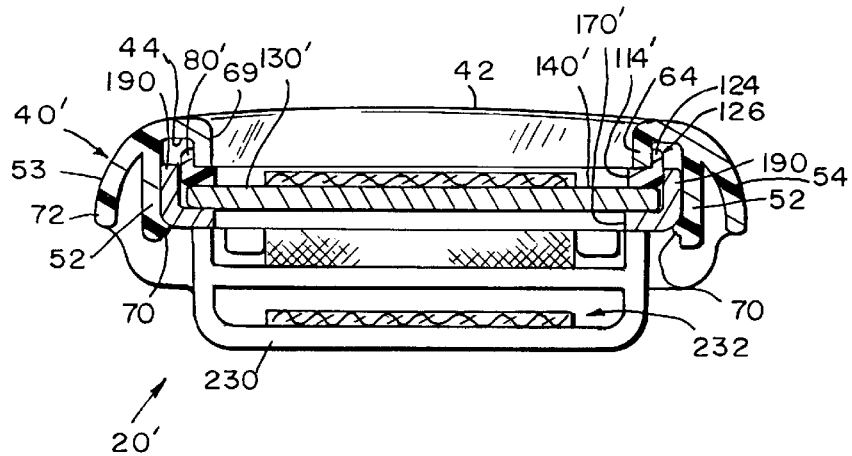
FIG. 10 illustrates a sectional view of the adjuster embodiment illustrated in FIGS. 8–9, taken generally along section lines 10—10 of FIG. 9, showing the pincher and underlying guide rails of the actuator sandwiched between portions of the plate and a portion of the housing.

FIGS. 2–7 illustrate a first embodiment of an adjuster for maintaining the length of a tether. This embodiment of the adjuster has a housing 40, an actuator 80, and a pincher 130 of particular configurations, described more fully below. FIGS. 8–10 illustrate a second embodiment of an adjuster 20' and FIGS. 1 and 11–16 illustrate a third embodiment of adjuster 20". The respective housings 40, 40', 40", actuators 80, 80', 80", and pinchers 130, 130', 130" have different configurations, described more fully below. It is within the scope of this disclosure to interchange between the illustrative embodiments the various parts of each. For example, the plate of the second and third embodiments could be replaced with the plate and guide portion of the first embodiment. Likewise, press surfaces shown on buttons of the actuator of the first or second adjuster embodiments could be provided on the buttons shown in the third adjuster embodiment.

As illustrated in FIG. 2, tethering system 16 includes a tether 18 and an adjuster 20 to maintain tether 18 at a desired length. Tethering system 16 further includes one or more anchors 22, illustrated in FIG. 1, coupled to the vehicle to provide anchoring points for tether 18. As illustrated in FIG. 1, tether 18 is coupled to and extends between juvenile seat 10 and anchors 22. Although anchors 22 are illustrated between the seat back and seat bottom of the rear vehicle seat and on the shelf behind the rear vehicle seat, the anchors may be positioned in a variety of locations in a vehicle.

As illustrated in FIGS. 1–3, 5–7, 9, 13, 14 and 16, tether 18 includes a fixed-length web 24 and an adjustable web 26, each coupled to one of the adjusters 20, 20', or 20". Each of adjusters 20, 20', 20" permits a user to reduce the length of tether 18 by simply pulling on a free end of adjustable web 26. The user can manually actuate the adjuster to increase the length of adjustable web 26.

Fixed length web 24 includes a retainer 28 to couple tether 18 to anchor 22 and hold juvenile seat 10 in position relative to vehicle seat 15. Illustratively, retainer 28 includes a hook 27 and a spring closure 29 that prevents hook 27 from inadvertently detaching from the anchor to which retainer 28 is coupled. Fixed-length web 24 also includes a loop 32, shown for example in FIG. 2, by which adjuster 20, 20', 20" is attached to it. Adjustable web 26 includes a first, free end 34, a second end 35, and an intermediate portion 36 therebetween. As shown in FIG. 2, part of the intermediate portion 36 is coupled to a base 38 to receive juvenile seat 10. It is within the scope of this disclosure to couple intermediate portion 36 directly to juvenile seat 10, as shown in FIG. 1, or base 38 as shown in FIG. 2. It is also within the scope of this disclosure to couple second end 35 to juvenile seat 10 or base 38. Adjustable web 26 is threaded through adjuster 20, 20', 20" so that free end 34 is accessible to a user. It is within the scope of this disclosure to change the orientation of the fixed and adjustable webs so that fixed-length web 24 is coupled to the juvenile seat and adjustable web 26 is coupled to the anchor 22. Additionally, it is within the scope of this disclosure to couple retainer 28 directly to adjuster 20, 20', 20" without including a second web. It is also within the scope of this disclosure for adjustable web 26 to be routed through passageways, slots, openings or the like formed in seat 10 such as disclosed in U.S. patent application Ser. No. 10/074,637 now U.S. Pat. No. 6,592,183 entitled "Vehicle Anchor System for Juvenile Vehicle Seat," filed Feb. 13, 2002, by James M. Kain, and U.S. patent application Ser. No. 10/074,798 "Vehicle Anchor System for Juvenile-Seat Base," filed Feb. 13, 2002, by James M. Kain, both assigned to the same assignee as this application. As illustrated in FIG. 2, a second retainer 28 may be provided to attach to another anchor 22 so that opposite distal ends of tether system 16 are coupled to respective anchors 22. As illustrated in FIG. 2, tether 18 is coupled at intermediate portion 36 to base 38 with a retention strap 39 to keep the base and tether together. Illustratively, strap 39 is elastic to permit some movement of tether 18 as a user adjusts the length of tether 18. It is within the scope of this disclosure to couple retention strap, 39 to juvenile seat 10.

Each adjuster 20, 20', 20" includes a respective housing 40, 40', 40" having outer and inner surfaces 42, 44, a central portion 46, and first and second end portions 48, 50. Each housing 40, 40', 40" further includes a wall 52 adjacent the perimeter of the housing 40, 40', 40" extending from inner surface 44 at sides 53, 54 and end portions 48, 50 to form a cavity 56 to receive other components of the adjuster 20, 20', 20" as described below. Wall 52 includes openings 58 at sides 53, 54 adjacent central portion 46. Each of sides 53, 54 are formed to include a cutout or concavity 78 adjacent central portion 46.

Figure 13:
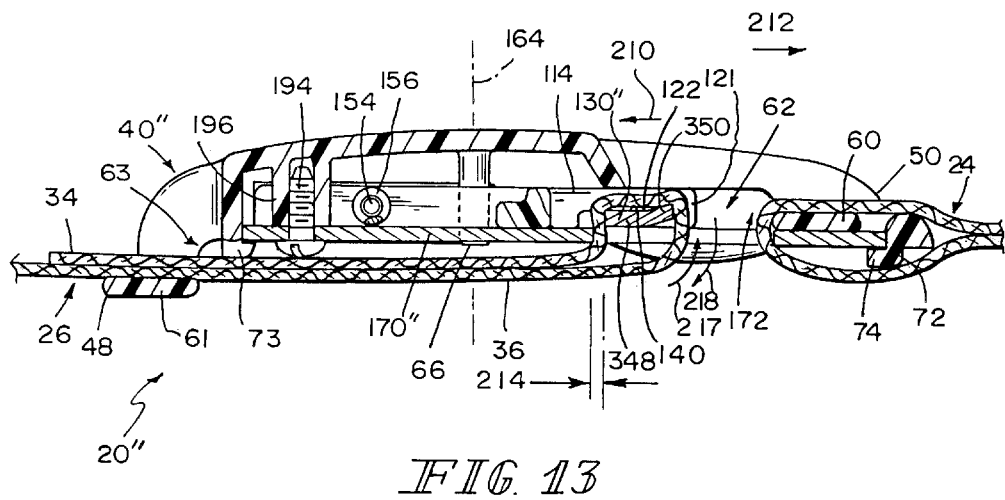
FIG. 13 illustrates a sectional view of the adjuster of FIG. 1 taken generally along section lines 13—13 showing the actuator and the pincher in the first web retaining position, an adjustable first web looped around the pincher, and a second web fixed to the adjuster.

Each housing 40, 40', 40" further includes an end bar 60 extending between sides 53, 54 and spaced apart from central portion 46 forming a slot or opening 62 in the housing. Opening 62 has a width sized to receive the width of tether 18. Opening 62 is bounded by bar 60 and by an interior wall 64 that extends from inner surface 44 along sides 53, 54 and central portion 46. As illustrated in FIGS. 9 and 13, housings 40', 40" each include a second end bar 61 spaced from central portion 46, forming a second opening 63. Second opening 63 is sized to receive the width of tether 18 therein. As explained below, portions of tether can be passed through second opening 63 to maintain the tether in an organized fashion or to assure proper orientation of adjustable web 26 during operation of adjusters 20' and 20".

Figure 4:
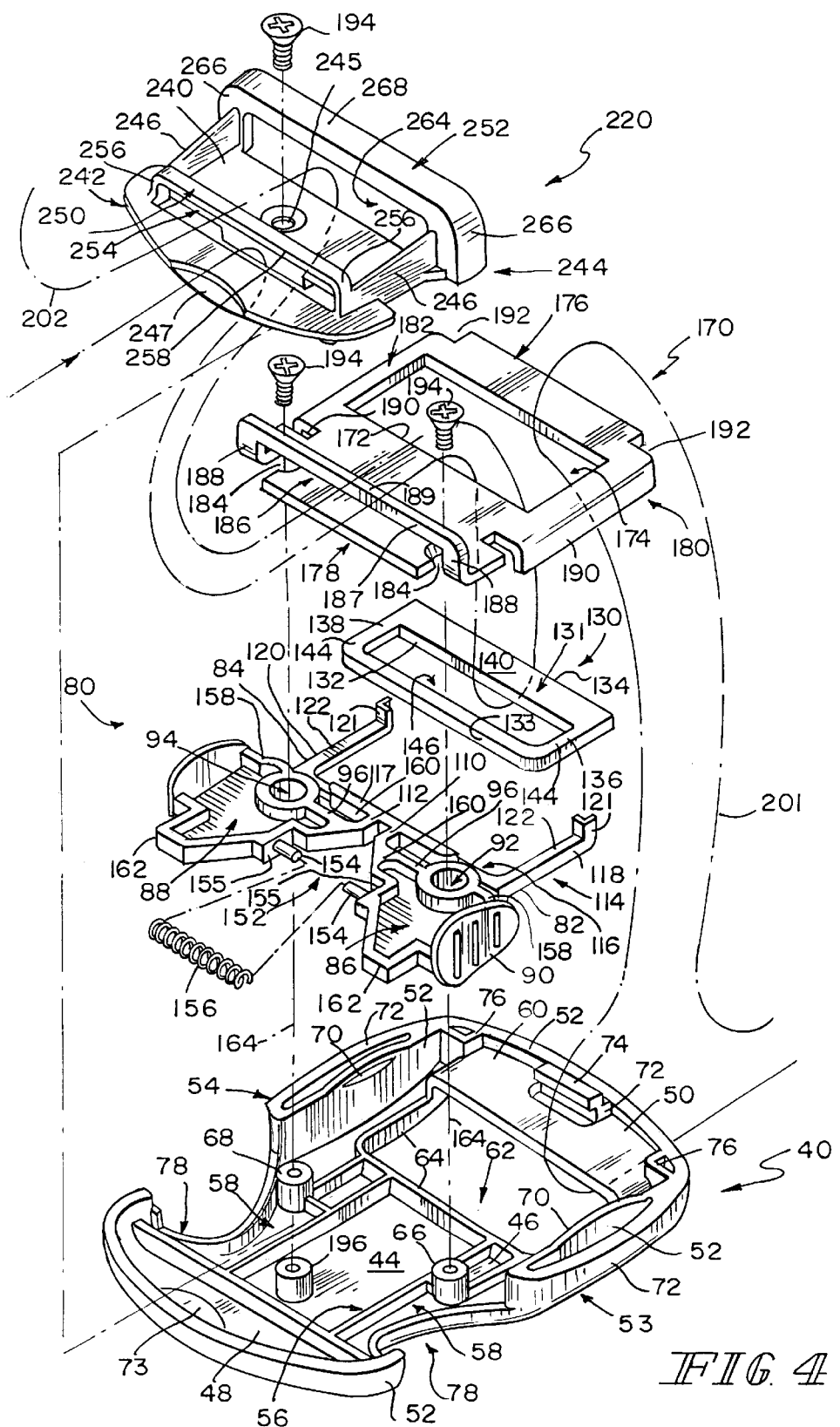
FIG. 4 illustrates an exploded perspective of the adjuster of FIG. 2 showing a guide portion at the top of the page, a plate positioned below the guide portion, the guide portion and the plate separated from an adjuster housing at the bottom of the page to expose an actuator, a spring, and a pincher situated between the plate and the housing.
Figure 11:
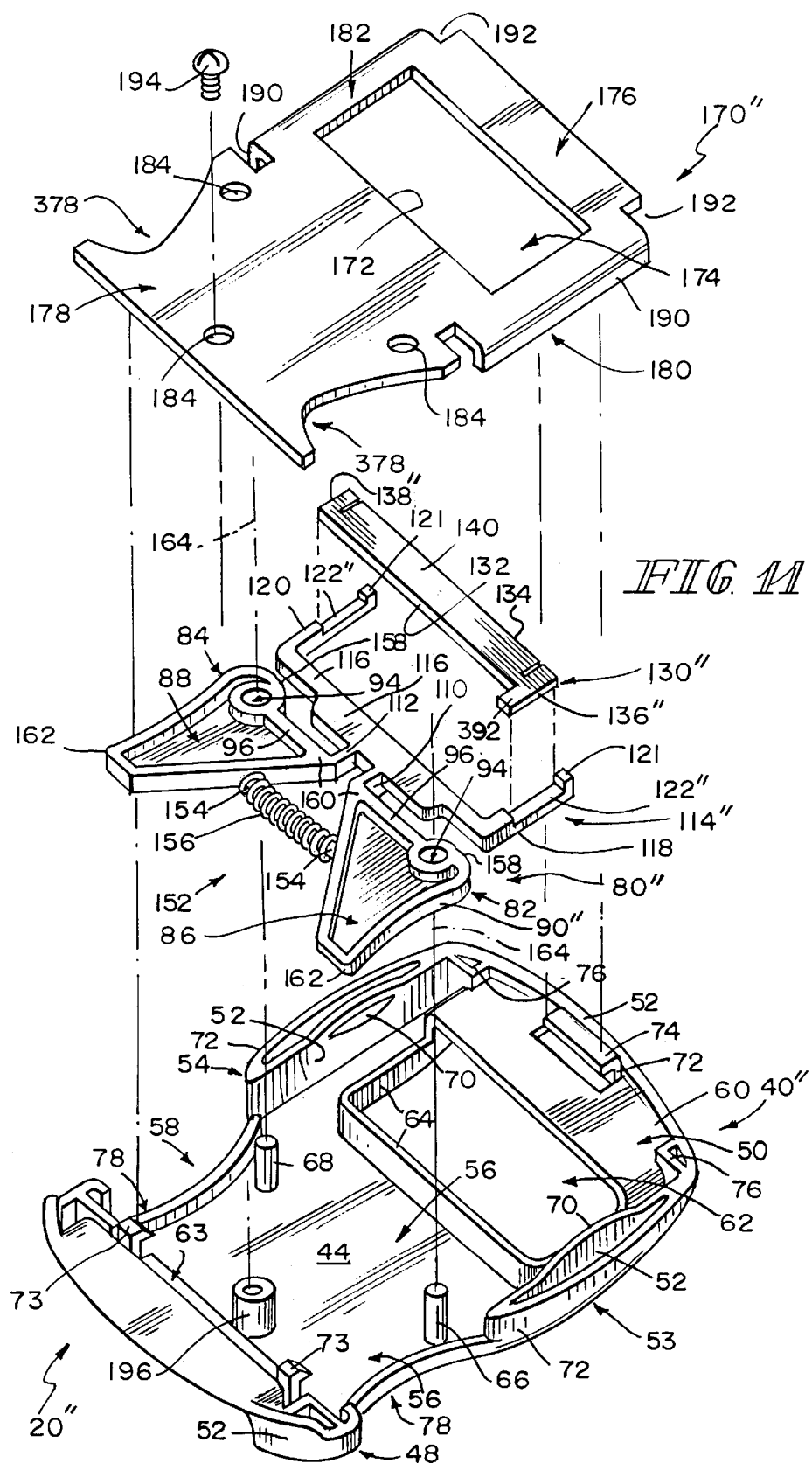
FIG. 11 illustrates an exploded perspective a third embodiment of the adjuster showing a plate at the top of the page separated from an adjuster housing at the bottom of the page to expose an actuator and a pincher situated between the plate and the housing.

As illustrated in FIGS. 4, 8, and 11, adjusters 20, 20', 20" also include actuators 80, 80', 80", respectively, coupled to respective housings 40, 40', 40". Each actuator 80, 80', 80" is operatively coupled to a pair of posts 66, 68 extending from inner surface 44 of its respective housing 40, 40', 40". Each actuator 80, 80', 80" includes opposite sides 82, 84 and first and second actuation buttons 86, 88. Each button 86, 88 includes, in the first, second, and third embodiments respectively, a press surface 90, 90', 90" adjacent a respective side 82, 84 of the actuator. As shown in FIGS. 4, 8, and 11, openings 92, 94 are formed in lower portions 96 of respective buttons 86, 88 near the press surfaces 90. Openings 92, 94 are sized and positioned to receive posts 66, 68 to mount actuator 80, 80', 80" to respective housing 40, 40', 40" and permit pivoting movement of buttons 86, 88 about posts 66, 68.

As illustrated in FIGS. 4, 8, and 11 respectively, each actuator 80, 80', 80" includes flexible arms 110, 112 spaced inwardly from openings 92, 94 and extending from each button 86, 88. A pincher carrier portion 114, 114', 114" is coupled to arms 110, 112 in each of the first, second, and third embodiments respectively. Each carrier portion 114, 114', 114" includes a transversely extending bar 116 and first and second fingers 118, 120, each of which extends away from bar 116. In the first and second embodiments, illustrated in FIGS. 4 and 8 respectively, bar 116 includes a wall 117 extending in a direction away from inner surface 44 when actuator 80, 80' is coupled to housing 40, 40'. As shown in FIGS. 4, 8, and 11, each finger 118, 120 includes an upwardly curved end portion 121. Curved end portion 121 cooperates with wall 117 to form notches 122, 122' at respective sides 82, 84 of actuator 80, 80'. In the third embodiment illustrated in FIG. 11, notches 122" are formed in fingers 118, 120. The notch 122" in first finger 118 is longer than the notch 122" in second finger 120 to assure proper orientation of parts during assembly of adjuster 20".

Illustratively, buttons 86, 88, arms 110, 112, and carrier portion 114, 114', 114" are integrally molded. However, it is within the scope of this disclosure for the actuator 80, 80', 80" to be constructed from a plurality of parts. Buttons 86, 88 project outside housing 40, 40', 40" at openings 58 so that press surfaces 90, 90', 90" are exposed and can be depressed by a user. Press surfaces 90, 90', 90" are oriented in concavities 78 provided in sides 53, 54 of housing 40, 40', 40". The portions of sides 53, 54 of housing 40, 40', 40" that project laterally beyond the concavities 78 and press surfaces 90, 90', 90" tend to inhibit inadvertent actuation of actuator 80, 80', 80" due to depression of buttons 86, 88. In the first and second embodiments shown in FIGS. 4 and 8, press surfaces 90, 90' are somewhat oval in shape for engagement by the finger of a user. This enlarged surface area contacts more surface area of the user's finger, making actuation of the buttons 86, 88 more comfortable. It is within the scope of this disclosure to provide smooth portions, raised portions, or the like on press surfaces 90, 90', 90" to improve a user's grip or level of comfort when depressing the press surfaces.

Figure 14:
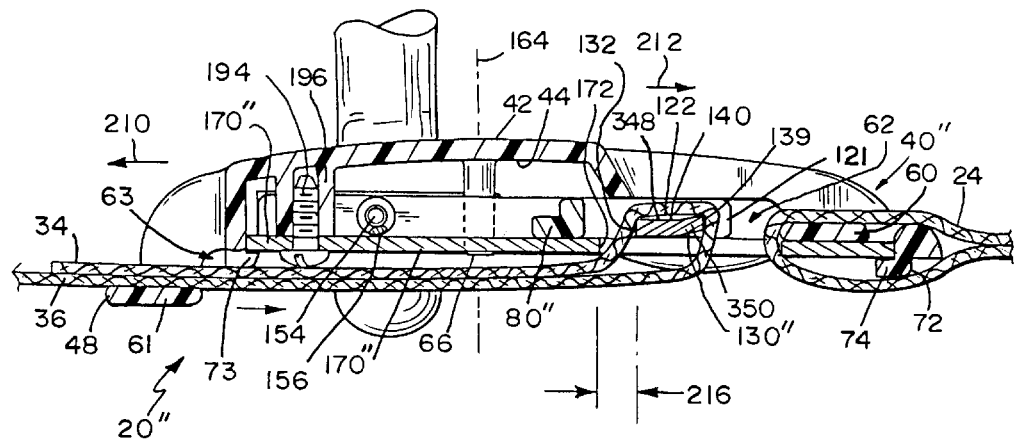
FIG. 14 illustrates a sectional view similar to FIG. 13 showing the actuator and pincher moved to the web adjusting position by a user squeezing together two buttons to release the pincher.
Figure 15:
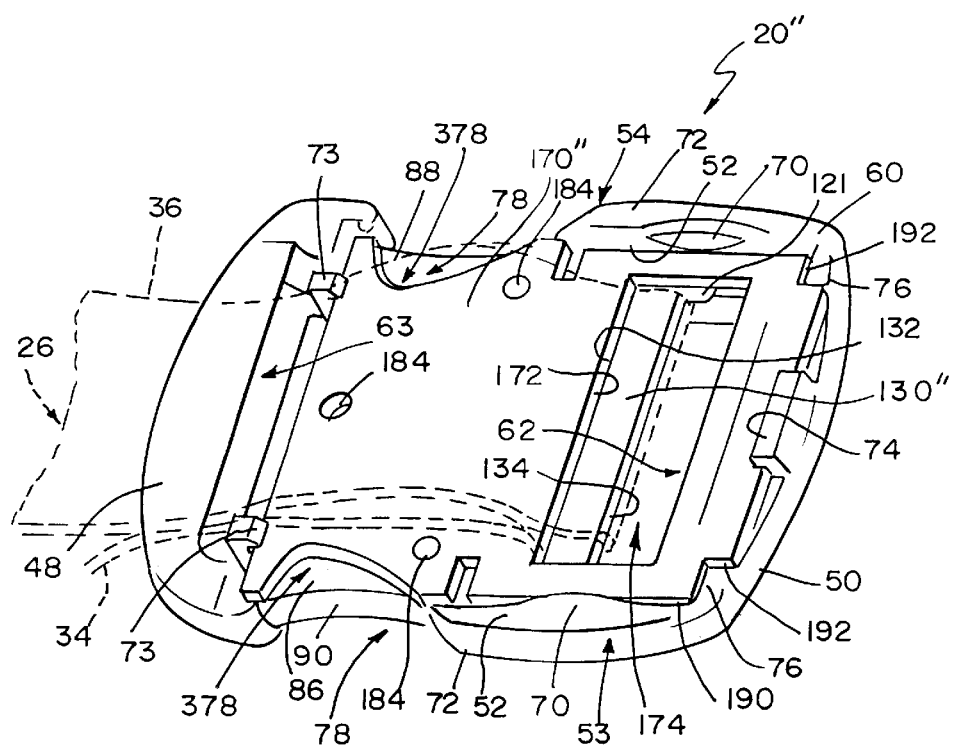
FIG. 15 illustrates a perspective view of the adjuster of FIG. 14 showing a portion of the adjustable web (in phantom) threaded through the housing and around the pincher.
Figure 16:
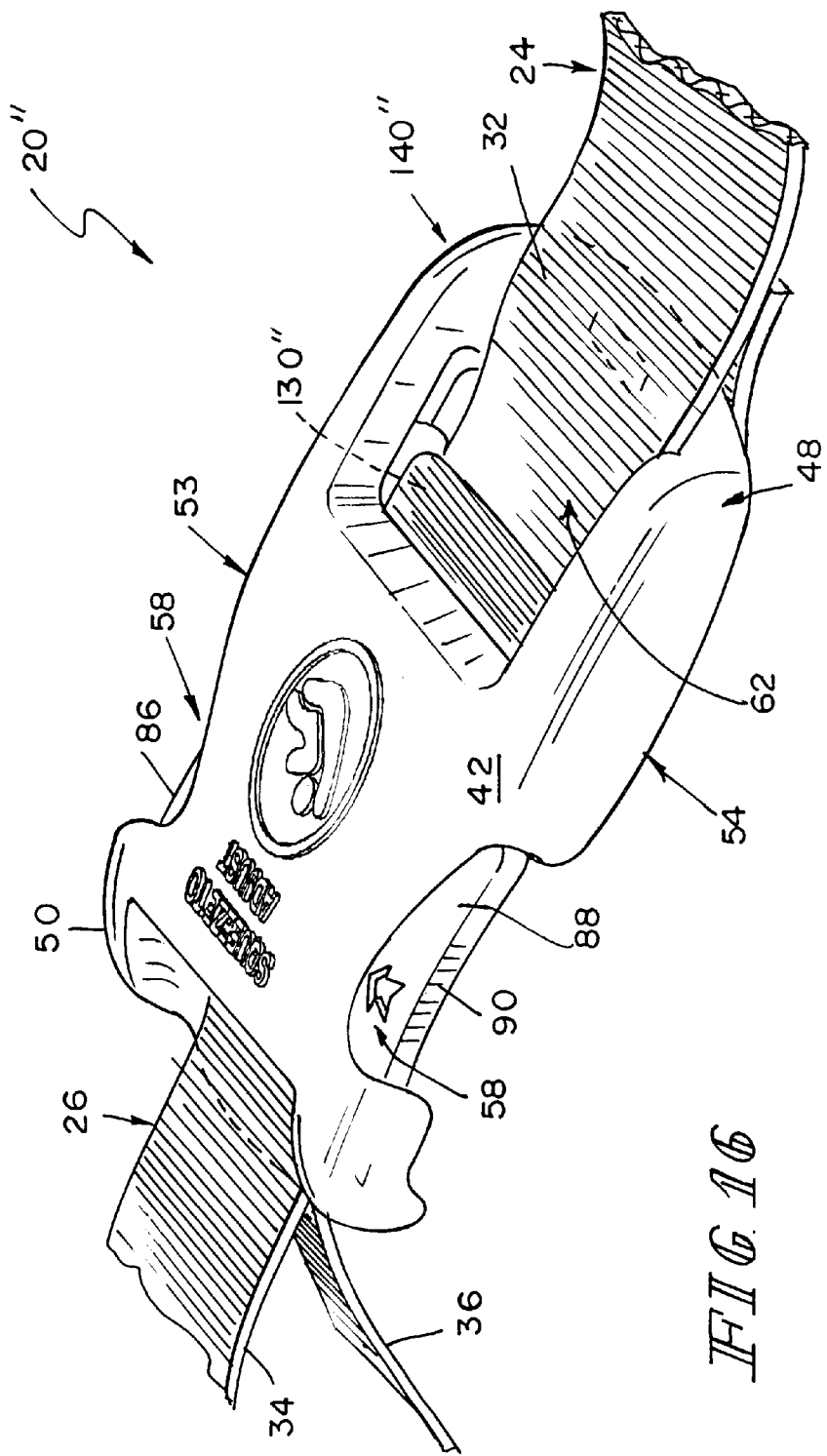
FIG. 16 illustrates a fragmentary perspective view of the adjuster of FIG. 1 showing the adjustable and fixed webs coupled to the adjuster.

As illustrated in FIGS. 4, 8, and 11, adjuster 20, 20', 20" further includes a pincher 130, 130', 130" that pinches against adjustable web 26 to restrict movement of adjustable web 26 and maintain the length of tether 18. Pincher 130, 130', 130" is movable on carrier portion 114, 114', 114" between a web retaining position, illustrated in FIGS. 7 and 12, and a web adjusting position, illustrated in FIG. 6 and FIG. 12 (in phantom). Pincher 130, 130', 130" includes a first segment 131 that has a pinching edge 132 and an opposite second edge 134 extending between first and second side edges 136, 138. First segment 131 has a top surface 140 and an opposite bottom surface 142. In the third embodiment, as best illustrated in FIGS. 13 and 14, pincher 130" includes a first portion 348 and a second portion 350 that slopes downwardly from the first portion 348.

Figure 12:
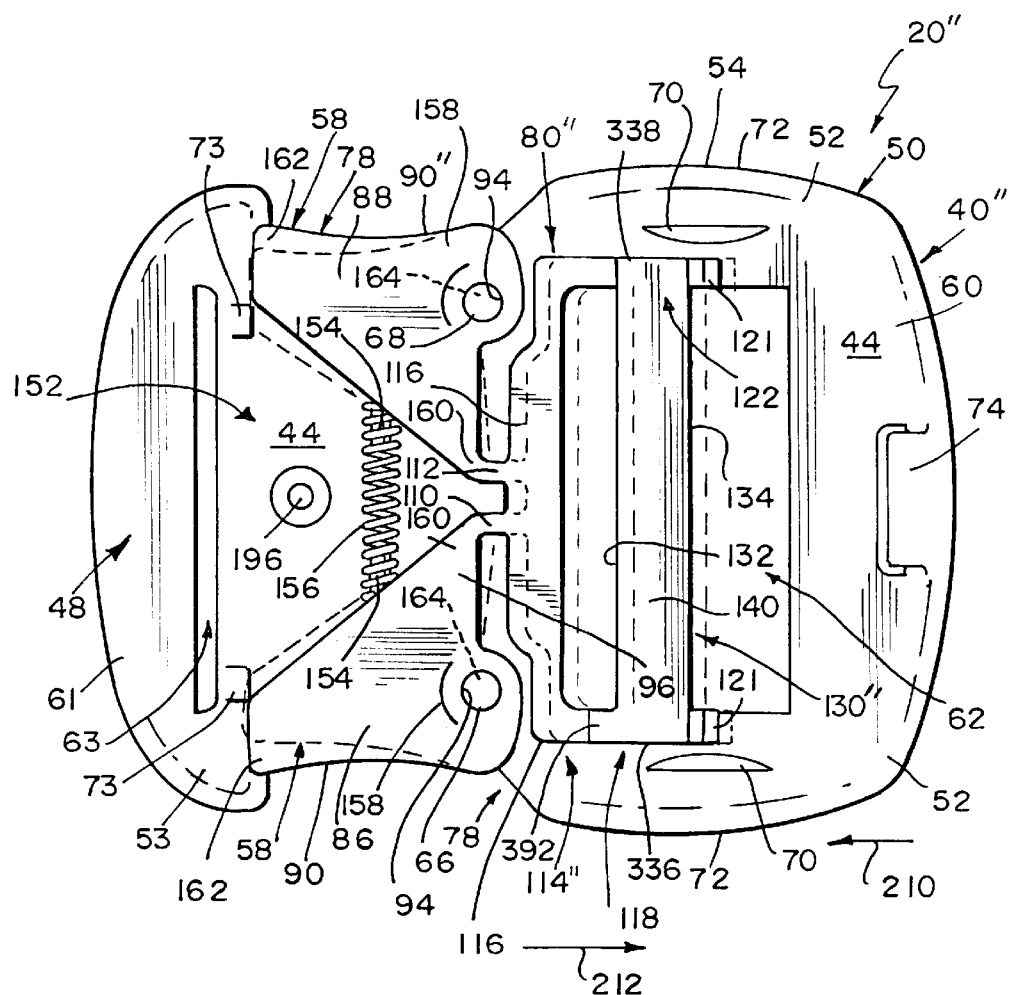
FIG. 12 illustrates a bottom plan view of the adjuster of FIG. 1 with the plate removed showing the actuator being movable between a web retaining position (in solid) and a web adjusting position (in phantom)

As illustrated in FIGS. 4 and 8, pincher 130, 130' further includes arms 144 extending from pinching edge 132 of first segment 131 adjacent each of side edges 136, 138 and a second segment 133 extending between arms 144. The first and second segments 131, 133 and the arms 144 surround an opening 146 in pincher 130, 130' through which tether 18 passes. As illustrated in FIGS. 6, 7, and 9, first and second side edges 136, 138 and arms 144 of pincher 130, 130' are configured to fit in notch 122 between wall 117 and upwardly curved end portions 121 of each finger 118, 120. Upon actuation of actuator 80, 80', pincher 130, 130' moves with carrier portion 114, 114' as wall 117 engages second segment 133 to move the pincher toward the web adjusting position. End portions 121 engage second edge 134 to move the pincher 130, 130' back toward the web retaining position once the actuator is released. In the third embodiment, as illustrated in FIGS. 11 and 12, first side edge 136" of pincher 130" illustratively includes an extension 392 so that first side edge 136" is longer than second side edge 138". Thus, first side 136" of pincher 130" is sized to fit in notch 122" of first finger 118 but not in notch 122" of second finger 120, thereby assuring proper orientation of pincher 130" in notches 122".

As illustrated in FIGS. 4, 8, and 11, actuator 80, 80', 80" includes a spring mount 152 including spring posts 154 extending from each of buttons 86, 88 toward each other. Spring 156 is mounted on posts 154 to bias the buttons 86, 88 away from each other. Openings 92, 94 are formed respective buttons 86, 88. Arms 110, 112 are coupled to respective buttons 86, 88 and are positioned inwardly of the openings 92, 94, respectively. In the first embodiment as illustrated in FIG. 4, posts 154 of actuator 80 extend from opposing walls 155 formed in buttons 86, 88 between corners 160, 162 so that posts 154 extend generally perpendicularly from walls 155. As illustrated in FIG. 4, buttons 86, 88 pivot about pivot axes 164 defined by posts 66, 68.

As illustrated in FIGS. 4, 8 and 11, each adjuster 20, 20', 20" includes a respective positioning plate 170, 170', 170" coupled to the housing to retain actuator 80, 80', 80", pincher 130, 130', 130", and spring 156 in place in cavity 56 of housing 40, 40', 40". Positioning plate 170, 170', 170" includes opposite ends 176, 178, and opposite sides 180, 182. Plate 170, 170', 170" includes an engagement edge 172 of an opening 174 formed in the plate, and generally facing end bar 60. When positioning plate 170, 170', 170" is coupled to housing 40, 40', 40", opening 174 is generally aligned with opening 62 of the housing to permit tether 18 to pass through the openings 174 and 62. It is within the scope of this disclosure for engagement edge 172 to be included on housing 40, 40', 40", for example on interior wall 64 or generally extending from inner surface 44 of the housing.

Positioning plate 170, 170', 170" is coupled to housing 40, 40', 40" by snapping plate 170, 170', 170" under tabs 70, 74 of housing 40, 40', 40". Side tabs 70 are cantilevered to wall 52 at sides 53, 54. End tab 74 is coupled to wall 52 at second end portion 50 of housing 40, 40', 40". Illustratively, wall 52 includes a second or reinforcement wall 72 coupled to wall 52 adjacent tabs 70, 74 at sides 53, 54 and second end portion 50.

In the first embodiment illustrated in FIG. 4, plate 170 is coupled to housing 40, end 176 of plate 170 fits under end tab 74 adjacent second end portion 50, and end 178 is adjacent central portion 46. Illustratively, end 178 terminates adjacent the midpoints of press surfaces 90 of buttons 86, 88. Plate 170 includes a pair of apertures 184 that receive screws 194 to secure the plate 170 to housing 40.

Apertures 184 align with screw holes formed in posts 66, 68 and receive screws 194 therein to further secure plate 170 to housing 40. In the second and third embodiments, as illustrated in FIGS. 8 and 11 respectively, plate 170', 170" illustratively includes a single screw aperture 184 to receive a screw 194 to secure plate 170', 170" in a hold 196 on inner surface 44 of housing 40. Apertures 184 in the second and third embodiments receive ends of posts 66, 68 to fix plate 170', 170" relative to housing 40', 40". In those embodiments, plates 170', 170" extend adjacent first end portions 48 of housings 40', 40" and are coupled to housings 40', 40" by a pair of end tabs 74 adjacent first end 48.

Plate 170, 170', 170" further includes a wall 190 extending from each of sides 180, 182. When the adjuster is fully assembled, walls 190 are nested between sides 53, 54 of housing 40, 40', 40" near opening 62 adjacent end bar 60. In this assembled state, walls 190 are each adjacent one of fingers 118, 120 of actuator 80, 80', 80" and assist with retention of pincher 130, 130', 130" in notches 122.

As illustrated in FIGS. 4, 8 and 11, housing 40, 40', 40" includes an inside corner 76 adjacent second end portion 50 at each of sides 53, 54. Inside corners 76 project from inner surface 44 and toward central portion 46. Inside corners 76 of housing 40, 40', 40" fit in notches 192 in end 176 of plate 170, 170', 170" to further assist in positioning plate 170, 170', 180" relative to housing 40, 40", 40".

As illustrated in FIG. 4, the first embodiment of adjuster 20 further includes a guide portion 220. Guide portion 220 overlies part of actuator 80 and guides movement of adjustable web 26 relative to adjuster 20. Guide portion 220 includes a central region 240, a first end 242, and a second end 244. Central region 240 is formed to include a hole 245 to receive a screw 194 to couple guide portion 220 to housing 40. When guide portion 220 is coupled to housing 40, first end 242 is adjacent first end portion 48 of housing 40 and second end 244 of guide portion 220 is adjacent central portion 46 of housing 40. Guide portion 220 includes a guide wall 246 extending upwardly from each side of central region 240. Guide walls 246 increase in height from first end 242 toward second end 244. Guide walls 246 are spaced apart from each other a distance sufficient to receive the width of adjustable web 26 therebetween. Another end tab 73 is cantilevered to wall 52 at first end portion 48 of housing 40. Guide portion 220 further includes a notch 247 formed in end 242 shaped to receive end tab 73.

Figure 3:
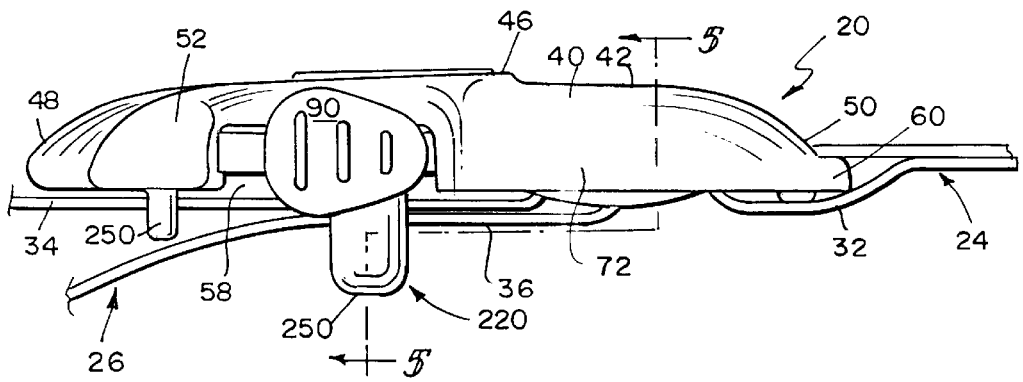
FIG. 3 illustrates a side elevational view of the adjuster illustrated in FIG. 2 showing an adjustable web coupled to the adjuster for movement relative thereto and a fixed web coupled to another portion of the adjuster.

As illustrated in FIGS. 3 and 4, guide portion 220 further includes first and second loops 250, 252 to retain different portions of the adjustable web 26 and to properly position the web portions during movement. When guide portion 220 is coupled to housing 40, first loop 250 is adjacent first end portion 48 of housing 40 and second loop 252 is intermediate first and second end portions 48, 50. First loop 250 includes a pair of spaced-apart arms 256 extending away from housing 40 when guide portion 220 is coupled to housing 40. A bight 258 extends between arms 256 to define a first gap 254 between first loop 250 and central region 240 adjacent first end 242.

Second loop 252 extends from second end 244 and cooperates with plate 170 to form a second gap 264 between second loop 252 and end 178 of plate 170. Second loop 252 includes a pair of spaced-apart arms 266 extending away from housing 40 when guide portion 220 is coupled to housing 40. A bight 268 extends between arms 266 to form second gap 264. As illustrated in FIGS. 6 and 7, an underside 270 of second loop 252 is formed to include a channel 272 extending the length of loop 252.

Illustratively, arms 266 of second loop are longer than arms 256 of first loop so that bight 268 is spaced from the surface of guide 220 farther than bight 258. As a result, first gap 254 is sized to receive only one pass of adjustable web 26 and second gap 264 is sized to receive two passes of adjustable web 26.

In the second and third embodiments illustrated in FIGS. 8 and 11, plate 170', 170" extends from adjacent first end portion 48 of housing 40', 40" to adjacent second end portion 50. Plate 170', 170" illustratively covers a majority of cavity 56 and a majority of the moving parts of adjuster 20', 20" when the plate is coupled to the housing. Housing 40', 40" in the second and third embodiments includes two end tabs 73 coupled to first end portion 48. These end tabs 73 are spaced apart from each other and extend over end 178 of plate 170', 170" when plate 170', 170" is coupled to housing 40', 40". Also in the second and third embodiments, housing 40', 40" is modified to include a second opening 63 at first end 48 having a width sized to receive the width of adjustable web 26. Housing 40' of the second embodiment further includes a web separator bar 230. Separator bar 230 is somewhat c-shaped and has a central portion spaced apart from housing 40' forming a slot or gap 232 between the housing and separator bar 230 through which free end 34 of adjustable web 26 is passed. Separator bar 230 maintains the orientation of adjustable web 26 to facilitate sliding movement of the web through adjuster 20'.

Adjuster 20, 20', 20" is assembled by positioning actuator 80, 80', 80" in housing 40, 40', 40" so that posts 66, 68 extend into openings 92, 94 of actuator 80, 80', 80". Spring 156 is positioned onto spring posts 154. Pincher 130, 130', 130" is positioned in carrier portion 114, 114', 114" of actuator 80, 80', 80" so that first and second side edges 136, 138 of the pincher are situated in notches 122, 122', 122" in first and second fingers 118, 120. Positioning plate 170, 170', 170" is coupled to the housing to overlie at least portions of actuator 80, 80', 80", pincher 130, 130', 130", and spring. Plate 170, 170', 170" is positioned so walls 190 are adjacent reinforcement walls 72 of housing 40, 40', 40". Plate 170, 170', 170" is slid and snapped into place so that tabs 70 at sides 53, 54 and tab 74 at second end portion 50 retain the plate against the housing. In the second and third embodiments, plate 170', 170" includes concavities 378 generally corresponding in size, and shape with concavities 78 of housing 40', 40" so that at each side 53, 54 of the housing, concavities 78, 378 are aligned with each other when plate 170', 170" is coupled to the housing. The tabs 73 at first end 48 aid in retaining plate 170', 170" against housing 40', 40". Screw(s) 194 is (are) inserted through each aperture 184—illustratively into posts 66, 68 in the first embodiment, and into boss 196 in all of the embodiments, to aid in securing plate 170, 170', 170" to housing 40, 40', 40".

In the first embodiment as illustrated in FIGS. 6 and 7, guide portion 220 is positioned so a connector 189 fits in channel 272 in underside 270 of second loop 252, thereby coupling plate 170 and guide portion 220 to minimize movement of the plate 170 and guide portion 220 relative to each other and relative to housing 40. Connector 189 is coupled to end 178 of plate 170 by a pair of spaced arms 188. Connector 189 is thus spaced apart from end 178, forming a slot 186 to permit movement of adjustable web 26 therethrough as the web is adjusted. End 242 of guide portion 220 is slid under tab 73 of housing 40. Screw 194 is inserted through hole 245 in guide portion 220 and screwed into hole 196 on inner surface 44 of housing 40.

To actuate actuator 80, 80', 80" to adjust the web 26, as illustrated in FIG. 6, FIG. 12 (in phantom), and FIG. 14, a user squeezes buttons 86, 88 together against the urging of spring 156. Depressing buttons 86, 88 causes pincher 130, 130', 130" to move in a direction 210 away from engagement edge 172 and away from adjustable web 26 to permit movement of web 26 relative to the housing. Actuation of actuator 80, 80', 80" permits lengthening of tether 18 by permitting movement of adjustable web 26 through adjuster 20, 20', 20" in a web-lengthening direction 217 and permits shortening of tether 18 by permitting movement of adjustable web 26 through the adjuster 20, 20', 20" in a web-shortening direction 218. Specifically, as a user squeezes buttons 86, 88 together, each button pivots about axis 164 of its associated post 66, 68. Arms 110, 112 move slightly generally in direction 212, illustrated for example, in FIGS. 6, 9, and 14, toward second end portion 50 of housing 40, 40', 40" permitting carrier portion 114, 114', 114" moving the carrier portion and pincher 130, 130', 130" to move in direction 212 away from the web retention position illustrated in FIGS. 7, 9, and 13. Moving the pincher in direction 212 increases the distance between pinching edge 132 and engagement edge 172 from a pinched distance 214 illustrated in FIGS. 7, 9, 13 to an unpinched distance 216 illustrated in FIGS. 6 and 14. When actuator 80, 80', 80" is actuated, adjustable web 26 is no longer pinched between edges 132, 172, and the functional length of tether 18 can be increased.

Figure 5:
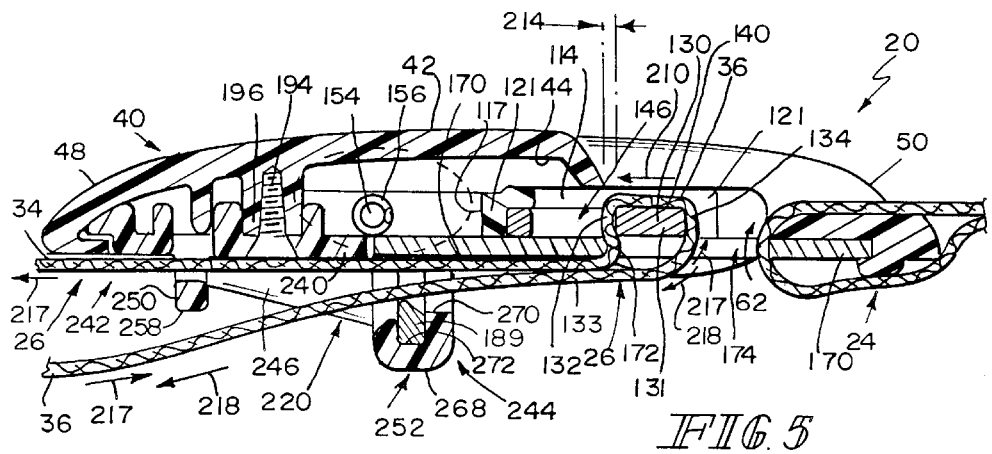
FIG. 5 illustrates a sectional view of the adjuster of FIG. 2 taken generally along section line 5—5 of FIG. 3 showing the pincher and underlying guide rails of the actuator sandwiched between portions of the plate and a portion of the housing.

As illustrated in FIGS. 5 and 10, carrier portion 114, 114', of actuator 80, 80' includes a guide rail 124 coupled to each finger 118, 120. Guide rails 124 position fingers 118, 120 properly during movement of actuator 80, 80' so that pincher 130, 130' is supported by carrier portion 114, 114'. Guide rails 124 face inner surface 44 of housing 40, 40' when the actuator 80, 80' is coupled to the housing. Each rail 124 is nested between interior wall 64 adjacent one of sides 53, 54 of housing 40, 40' and a corresponding one of walls 190 of plate 170, 170'. As actuator 80, 80' is actuated, each rail 124 slides in a groove 126 defined by walls 64, 190 and inner housing surface 44 to prevent undesired lateral movement of fingers 118, 120.

In the illustrated embodiments, adjustable web 26 is threaded through adjuster 20, 20', 20" so that the functional length of adjustable web 26 can be reduced without depressing buttons 86, 88; however, the functional length of tether 18 cannot be lengthened unless a user depresses buttons 86, 88. As illustrated in FIGS. 1, 6, 7, 9, 13, 14, and 16, fixed-length web 24 is coupled to second end portion 50 of housing 40, 40', 40". Specifically, as illustrated by directional arrow 201 of FIG. 4, adjuster-receiving portion 32 of fixed-length web 24 is threaded through opening 62. Illustratively, adjuster-receiving portion 32 is looped around end bar 60 and stitched to itself, coupling fixed-length web 24 to housing 40, 40', 40". Thus, fixed-length web 24 is coupled at adjuster-receiving portion 32 to adjuster 20, 20', 20".

As illustrated in FIGS. 1, 6, 7, 9, 13, 14, and 16, adjustable web 26 is threaded through adjuster 20, 20', 20". In each embodiment, adjustable web 26 is threaded through openings 62, 174 and between pinching edge 132 and engagement edge 172 so that the adjustable web 26 is retained in position relative to housing 40, 40', 40" until adjustment of the effective length of adjustable web 26 is desired.

In the first embodiment, as illustrated in FIGS. 6 and 7 and by directional arrow 202 of FIG. 4, free end 34 is passed through second loop 252 by threading it between bight 258 and end 178 of plate 170. Free end 34 is then threaded through opening 174 in plate 170 and between second edge 134 and end bar 60. Free end 34 is passed over top surface 140 of pincher 130 and back through openings 62 and 174 and between pinching edge 132 of pincher 130 and engagement edge 172 of plate 170. Finally, free end 34 is passed under second loop 252 and first loop 250 so that two passes of adjustable web pass through second loop 252 and one pass passes through first loop 250.

In the second embodiment, illustrated in FIG. 9, free end is passed under web separator bar 230 and through opening 174 in plate 170'. Free end 34 is then threaded between second edge 134 and end bar 60, and passed over top surface 140 of pincher 130'. Free end 34 is passed back through openings 62 and 174, between pinching edge 132 of pincher 130' and engagement edge 172 of plate 170'. Finally, free end 34 is passed through second opening 63 adjacent first end 48 of housing 40'.

In the third embodiment, illustrated in FIGS. 13 and 14, free end 34 is passed through second opening 63 adjacent first end 48 of housing 40", through opening 174 in plate 170", and between second edge 134 and end bar 60 of housing 40". Free end 34 is passed over top surface 140 of pincher 130" and back through opening 174, opening 62, and between pinching edge 132 of pincher 130" and engagement edge 172 of plate 170". Finally, free end 34 is passed back through second opening 63 adjacent first end 48 of housing 40". For any of the embodiments, it is within the scope of this disclosure to reverse the sequence of threading the adjustable web 26 through adjuster 20, 20', 20" or to thread another portion of adjustable web 26 through adjuster 20, 20', 20".

When a pulling force is applied to intermediate portion 36 of adjustable web 26, the portion of adjustable web 26 adjacent second edge 134 opposite pinching edge 132 is pulled against pincher 130, 130', 130", forcing the pinching edge closer to engagement edge 172. When actuator 80, 80', 80" is not actuated, this force pinches adjustable web 26 between pinching edge 132 and engagement edge 172, preventing movement of adjustable web 26. This prevents undesired increase in the effective length of adjustable web 26.

When intermediate portion 36 of adjustable web 26 is pulled by a user while actuator 80, 80', 80" is actuated, adjustable web 26 moves over top surface 140 of pincher 130, 130', 130", in opening 62, and in the space between pinching edge 132 and engagement edge 172 shown in FIGS. 6 and 14. This movement permits movement of adjustable web 26 in tether lengthening direction 217, resulting in an increase in the effective length of adjustable web 26. In the third embodiment, the sloped portion of top surface 140 of pincher 130" allows the web to travel more easily over top surface 140, permitting the user to lengthen the effective length of adjustable web 26.

When a user applies a pulling force to free end 34 of adjustable web 26, illustratively with or without actuation of actuator 80, 80', 80", adjustable web 26 is moved in tether shortening direction 218, resulting in a decrease in the functional length of tether 18. When a pulling force is applied to free end 34 of adjustable web 26 when actuator 80, 80', 80" is not actuated, the portion of the adjustable web 26 against pinching edge 132 of pincher 130, 130', 130" forces the pinching edge away from engagement edge 172 of plate 170, 170', 170" toward the position shown in FIGS. 6 and 14. In this position, the pulling force moves adjustable web 26 over top surface 140 of pincher 130, 130', 130", in opening 62, and in the space between pinching edge 132 and engagement edge 172. Thus, the functional length of tether 18 is shortened. Alternatively, as shown in FIG. 5 when a user actuates actuator 80, 80', 80", the user can likewise pull free end 34 and move adjustable web 26 through the space between pinching edge 132 and engagement edge 172, over top surface 140 of the pincher, and through opening 62. This movement again shortens the functional length of tether 18. As used herein, "effective length" and "functional length" mean the length of the taut tether or the taut length of a portion of the tether between the retained object, illustratively the juvenile seat, and the device to which the retained object is coupled, illustratively the anchor. For example, the functional length of the adjustable web can be the portion of the adjustable web extending between the pincher and the juvenile seat in one arrangement, or the anchor if the adjustable web is between the adjuster and the anchor. The phrase is used to acknowledge that the actual length of a web is not increased when the tethering system is adjusted, but rather the functional length is adjusted.

It is within the scope of this disclosure for adjuster 20, 20', 20" to have an additional housing piece that couples to housing 40, 40', 40" so that plate 170, 170', 170" is sandwiched between the housing and the additional piece. Alternatively, such an additional housing piece may be configured to provide the engagement edge and the plate may be omitted in such an embodiment. Further, it is within the scope of this disclosure for housing 40, 40', 40" to be configured to provide an engagement edge. Additionally, although pincher 130, 130', 130" has been disclosed as a separate piece from actuator 80, 80', 80", it is within the scope of this disclosure to include the pincher as part of the actuator.

Although the invention has been described in detail with reference to certain illustrative embodiments, variations and modifications exist within the scope and spirit of the invention as shown and described.

What is claimed is:

1. A tether length adjuster for use with an adjustable tether system having an adjustable web for securing a juvenile seat to a vehicle seat, the adjuster comprising:
 a housing adapted to receive the adjustable web, an actuator coupled to the housing, and a pincher having a pinching edge normally biased in a first direction engaging the adjustable web to retain the adjustable web relative to the housing, the actuator including an actuation button spaced apart from the pincher, wherein the pincher moves in a second direction opposite the first direction in response to a pressing force applied to the button, wherein the actuator has a movement converter and a biasing member separate from the movement converter, the movement converter is arranged to convert pivoting movement of the button into linear movement of the pincher, and the biasing member is arranged to bias the button in a direction transverse to the linear movement of the pincher to move the movement converter to bias the pinching edge in the first direction.

2. The apparatus of claim 1, wherein the movement converter has a pincher carrier that carries the pincher and that moves in response to movement of the button.

3. The apparatus of claim 2, wherein the pincher carrier moves generally parallel to a direction of web travel through the housing.

4. The apparatus of claim 2, wherein the movement converter includes a flexible arm to transfer pivoting movement of the button into linear movement of the pincher carrier, the arm being coupled to the button and to the pincher carrier.

5. The apparatus of claim 1, wherein the movement converter includes a flexible arm coupled to the button and the pincher.

6. A tether length adjuster for use with an adjustable tether system having an adjustable web for securing a juvenile seat to a vehicle seat, the adjuster comprising:
 a housing adapted to receive the adjustable web, an actuator coupled to the housing, and a pincher having a pinching edge normally biased in a first direction engaging the adjustable web to retain the adjustable web relative to the housing, the actuator including an actuation button spaced apart from the pincher, wherein the pincher moves in a second direction opposite the first direction in response to a pressing force applied to the button, wherein the actuator includes a flexible arm coupled to the button and the pincher, the arm transferring pivoting movement of the button into linear movement of the pincher, and the button, the flexible arm, and the pincher carrier are formed as a single, monolithic piece.

7. The apparatus of claim 5, wherein application to the button of a force directed inwardly toward a centerline of the housing pivots the button and flexes the flexible arm to move the pincher in a direction parallel with the centerline.

8. The apparatus of claim 1, wherein the pinching edge moves along the centerline of the housing to permit movement of the first web in a direction shortening a functional length of the tether system without actuation of the actuator.

9. A web adjuster for changing the length of a tether having an adjustable web, the adjuster comprising:
 a housing,
 an actuator coupled to the housing, the actuator comprising a button pivotably coupled to the housing, a pincher, a movement transmitter engaging the button and the pincher to transmit movement therebetween, and a biasing member separate from the movement transmitter, the pincher moving in response to pivoting of the button between a first position in which the adjustable web is prevented from moving through the housing in a web-lengthening direction, and a second position in which the adjustable web is permitted to move through the housing in the web-lengthening direction, the biasing member being arranged to bias the button in a direction transverse to the movement of the pincher to move the movement transmitter to bias the pincher toward the first position.

10. The adjuster of claim 9, wherein pivoting of the button moves the pincher generally linearly between the first and second positions.

11. The adjuster of claim 10, wherein the movement transmitter comprises a flexible force-directing arm coupled to the button and the arm is coupled to the pincher to move the pincher generally linearly in response to pivoting movement of the button.

12. The adjuster of claim 9, further comprising a plate coupled to the housing to retain the actuator against the housing, the plate including an engagement edge, the actuator including a second button opposite the first button, the biasing member being coupled to the buttons to bias each button away from the other and to bias the pincher toward the engagement edge to pinch the web between the pincher and the engagement edge and inhibit movement of the web relative to the housing.

13. An adjustable tethering system for use in securing a juvenile seat on a seat or similar surface in a vehicle by coupling the juvenile seat to an anchor in the vehicle with the tethering system, the tethering system comprising:

an adjustable web, and an adjuster having a housing coupled to the adjustable web and configured to be coupled to the juvenile seat, the adjustable web having a functional length defined by the length of the portion of the web extending between the adjuster and the juvenile seat, the adjuster cooperating with the adjustable web to adjust the functional length of the adjustable web, the adjuster comprising an actuator comprising a pivotable button, a movement converter, a pincher, and a biasing member separate from the movement converter, the movement converter being arranged to convert pivoting movement of the button into linear movement of the pincher to move the pincher between a first position pinching the adjustable web between the pincher and the housing to prevent adjustment of the functional length of the adjustable web when the adjustable web is pulled in a direction to increase the functional length and a second position spaced apart from the first position to permit movement of the adjustable web in a direction decreasing the functional length without actuation of the button, the biasing member being arranged to bias the button in a direction transverse to the linear movement of the pincher to move the movement converter to bias the pincher toward the first position.

14. The apparatus of claim 13, wherein, the pincher providing a pinching edge to pinch the adjustable web against the housing when the actuator is in the first position.

15. The apparatus of claim 14, wherein the housing provides an engagement edge and the adjustable web passes between the pinching edge and the engagement edge and extends over a top surface of the pincher, the pinching edge pinching the adjustable web against the engagement edge when the actuator is in the first position.

16. The apparatus of claim 14, wherein the button is pivotably coupled to the housing, the movement converter includes an arm coupled to the button, and the actuator includes a pincher carrier coupled to the arm and the pincher.

17. The apparatus of claim 14, wherein the pincher is formed to include an aperture sized to receive the adjustable web, and the adjustable web passes through the aperture so that a portion of the adjustable web is situated between the pinching edge of the pincher and the engagement edge.

18. The apparatus of claim 14 further comprising a plate coupled to the housing, the plate including an engagement edge against which the adjustable web is biased when the actuator is in the first position.

19. The apparatus of claim 13, further comprising an engagement edge bordering an opening provided in the housing, the adjustable web has a second end coupled to the juvenile seat and a free end spaced apart from the second end, and the adjustable web is threaded between the pinching edge and the engagement edge, over a top surface of the pincher, and through the opening in the housing.

20. The apparatus of claim 19 further comprising a plate coupled to the housing, the plate including the engagement edge and a terminal end portion extending away from the inner surface of the housing, the terminal end portion having a slot formed therein, the free end and the second end being threaded through the slot to orient the adjustable web relative to the housing and the pincher.

21. The apparatus of claim 13, wherein the adjustable web includes a first end and a second end, the housing includes a first housing end and a second housing end, and the adjuster further comprises a separator coupled to the housing adjacent one of the housing ends, the separator cooperating with the housing to define a gap therebetween, and a first portion of the adjustable web adjacent one of the fixed or free ends is positioned in the gap so that a second portion of the adjustable web is separated from the first portion to reduce friction between the portions when the adjustable web is moved relative to the adjuster.

* * * * *